US012523967B2

(12) United States Patent
Kaneniwa

(10) Patent No.: US 12,523,967 B2
(45) Date of Patent: Jan. 13, 2026

(54) WATCH

(71) Applicant: SEIKO EPSON CORPORATION, Tokyo (JP)

(72) Inventor: Kazuki Kaneniwa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 315 days.

(21) Appl. No.: 18/349,643

(22) Filed: Jul. 10, 2023

(65) Prior Publication Data

US 2024/0012362 A1 Jan. 11, 2024

(30) Foreign Application Priority Data

Jul. 11, 2022 (JP) ................................ 2022-111004

(51) Int. Cl.
*G04G 3/00* (2006.01)

(52) U.S. Cl.
CPC .................................... *G04G 3/00* (2013.01)

(58) Field of Classification Search
CPC . G04G 3/00; G04G 3/02; G04G 5/043; G04C 9/00; H01H 19/63; H01H 25/06; G05B 19/108
See application file for complete search history.

(56) References Cited

U.S. PATENT DOCUMENTS

| | | | | | |
|---|---|---|---|---|---|
| 4,022,013 | A * | 5/1977 | Kamijo | G04C 13/11 | 368/188 |
| 4,430,578 | A * | 2/1984 | Waigand | G05B 19/108 | 307/115 |
| 5,530,407 | A | 6/1996 | Yabe et al. | | |
| 6,846,998 | B2 * | 1/2005 | Hasumi | G04C 3/001 | 200/341 |
| 7,278,782 | B2 * | 10/2007 | Ebi | G04C 9/00 | 368/321 |

FOREIGN PATENT DOCUMENTS

| | | | |
|---|---|---|---|
| JP | S58-148994 | A | 9/1983 |
| JP | S63-139592 | U | 9/1988 |
| JP | H06-027265 | A | 2/1994 |
| JP | 2006-242683 | A | 9/2006 |

* cited by examiner

*Primary Examiner* — Edwin A. Leon
(74) *Attorney, Agent, or Firm* — Harness, Dickey & Pierce, P.L.C.

(57) ABSTRACT

A main plate at which a watch component is disposed, a circuit board including a regulating pattern, a regulating switch disposed contactably with the circuit board, and a holding member disposed on a side opposite to the circuit board with respect to the regulating switch are included, the regulating switch includes a guide pin fixed to the main plate, a lever body including an opening portion into which the guide pin is inserted and a contact portion that contacts the regulating pattern, and a coil spring including an opening portion into which the guide pin is inserted and presses the lever body toward the circuit board, and the holding member holds the coil spring sandwiched between the holding member and the lever body.

4 Claims, 10 Drawing Sheets

| STEP / PATTERN | -2 | -1 | 0 | +1 | +2 | +3 |
|---|---|---|---|---|---|---|
| AS1 | 0 | 1 | 0 | 0 | 0 | 0 |
| AS2 | 1 | 0 | 0 | 0 | 0 | 0 |
| AS3 | 1 | 0 | 1 | 1 | 0 | 0 |
| AS4 | 0 | 1 | 0 | 1 | 1 | 0 |

WATCH

The present application is based on, and claims priority from JP Application Serial Number 2022-111004, filed Jul. 11, 2022, the disclosure of which is hereby incorporated by reference herein in its entirety.

BACKGROUND

1. Technical Field

The present disclosure relates to a watch.

2. Related Art

JP-UM-A-63-139592 discloses structure of a regulating switch of an electronic watch in which a circuit board having a regulating pattern and a regulating switch lever are brought into electrical contact with each other to perform logical slowing/quickening. The regulating switch lever contacts the circuit board at a predetermined pressure by bending a switch arm portion upward, that is, by using the switch arm portion as an S-shaped leaf spring.

However, in the technique disclosed in JP-UM-A-63-139592, since the regulating switch lever has the leaf spring structure, there is a possibility that the switch arm portion is deformed by impact due to dropping or the like. As a result, there is a problem in that the regulating switch lever cannot sufficiently apply pressure against the circuit board, and the logical slowing/quickening does not function properly.

SUMMARY

A watch includes a main plate at which a watch component is disposed, a circuit board including a regulating pattern, a rotary switch disposed contactably with the circuit board, and a holding member disposed on a side opposite to the circuit board with respect to the rotary switch, wherein the rotary switch includes a guide pin fixed to the main plate, a lever body including an opening portion into which the guide pin is inserted and a contact portion that contacts the regulating pattern, and a coil spring including an opening portion into which the guide pin is inserted and presses the lever body toward the circuit board, and the holding member holds the coil spring sandwiched between the holding member and the lever body.

DESCRIPTION OF EXEMPLARY EMBODIMENTS

The following description is given with reference to the drawings including an X axis, a Y axis, and a Z axis that are three axes orthogonal to each other. A direction along the X axis is referred to as “X direction”, a direction along the Y axis is referred to as “Y direction”, and a direction along the Z axis is referred to as “Z direction”. A direction indicated by an arrow is a + direction, and a direction opposite to the + direction is a − direction. Note that, a +Z direction may be also referred to as “up” or an “upper side”, and a −Z direction may be also referred to as “down” or a “lower side”. Furthermore, as viewed in the +Z direction or the −Z direction is referred to as in plan view or plane view. Furthermore, the description is given assuming that a surface on the + side in the Z direction is an upper surface, and a surface on the opposite side, that is, on the − side in the Z direction is a lower side.

First, a configuration of a watch 1 will be described with reference to FIGS. 1 and 2.

Figure 1:
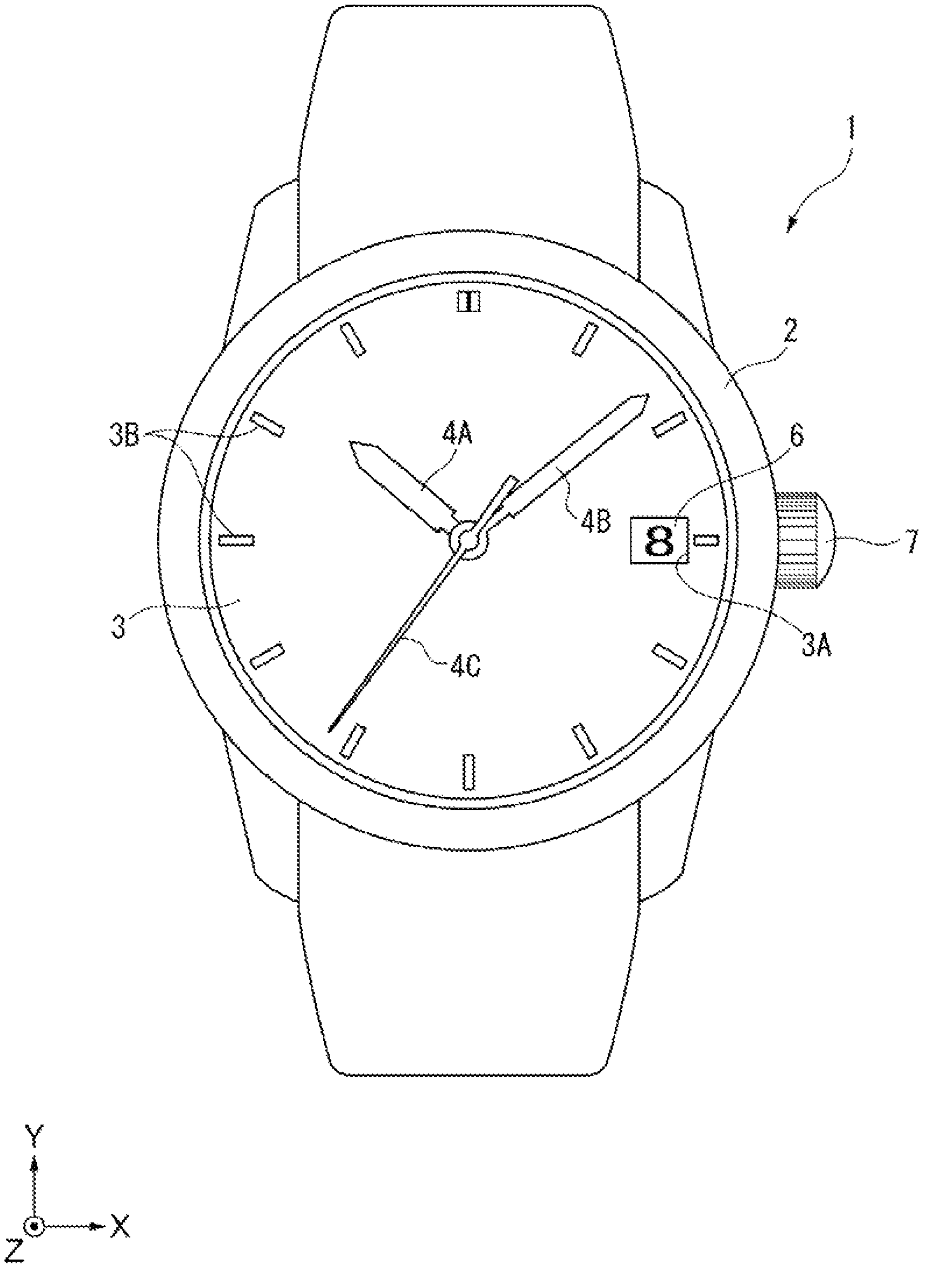
FIG. 1 is a plan view illustrating a configuration of a watch.

As illustrated in FIG. 1, the watch 1 is a wristwatch worn on a wrist of a user and includes a cylindrical outer case 2, and a dial 3 is disposed on an inner circumference side of the outer case 2. Among two opening portions of the outer case 2, an opening portion on a front surface side is closed by cover glass, and an opening portion on a back surface side is closed by a case back 8. Note that FIG. 2 illustrates a state in which the case back 8 is removed.

The watch 1 includes the dial 3, a movement (not illustrated), an hour hand 4A, a minute hand 4B and a seconds hand 4C that display time information, which are accommodated in the outer case 2. The dial 3 is provided with a calendar small window 3A, and a date indicator 6 is visible through the calendar small window 3A. Further, the dial 3 is provided with an indicator 3B for displaying an hour.

A crown 7 is provided at a side surface of the outer case 2. For example, the crown 7 can be pulled out and moved from a zeroth stage position into which the crown 7 is pushed toward a center of the watch 1 to a first stage position and a second stage position. For example, when the crown 7 is pulled to the first step position and rotated, the date indicator 6 can be moved to set a date. When the crown 7 is pulled to the second stage position, the seconds hand 4C is stopped, and when the crown 7 is rotated at the second stage position, the hour hand 4A and the minute hand 4B can be moved to set a time.

Figure 2:
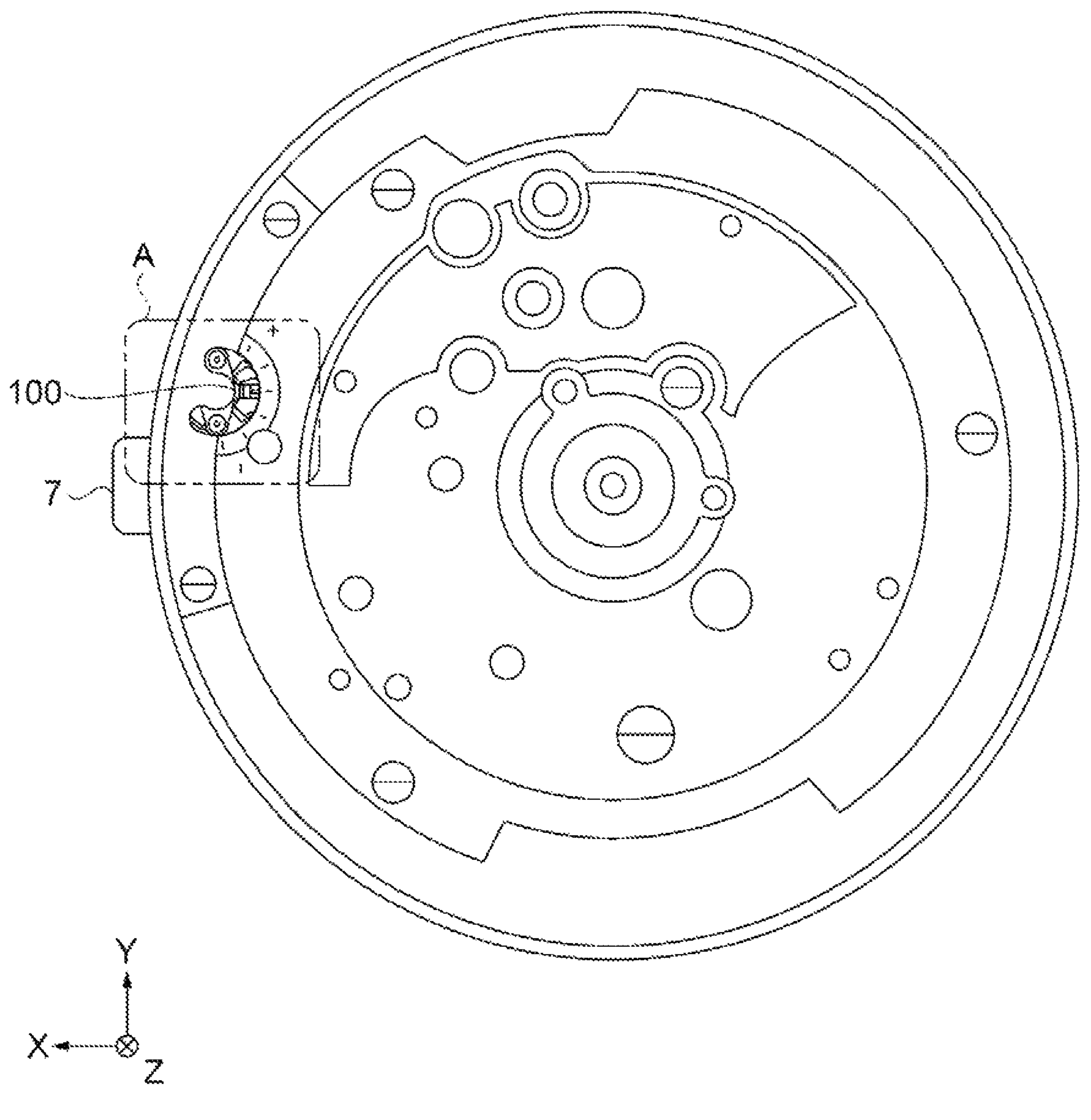
FIG. 2 is a plan view illustrating a configuration of a case back side of the watch.

As illustrated in FIG. 2, when the case back 8 of the watch 1 is removed, a regulating switch 100 as a rotary switch is disposed near the crown 7, for example. The regulating switch 100 is a switch for adjusting accuracy when an advance or delay occurs depending on an environment, by switching circuits and applying correction at a certain period.

Next, a configuration of the regulating switch 100 will be described with reference to FIGS. 3 to 5.

Figure 5:
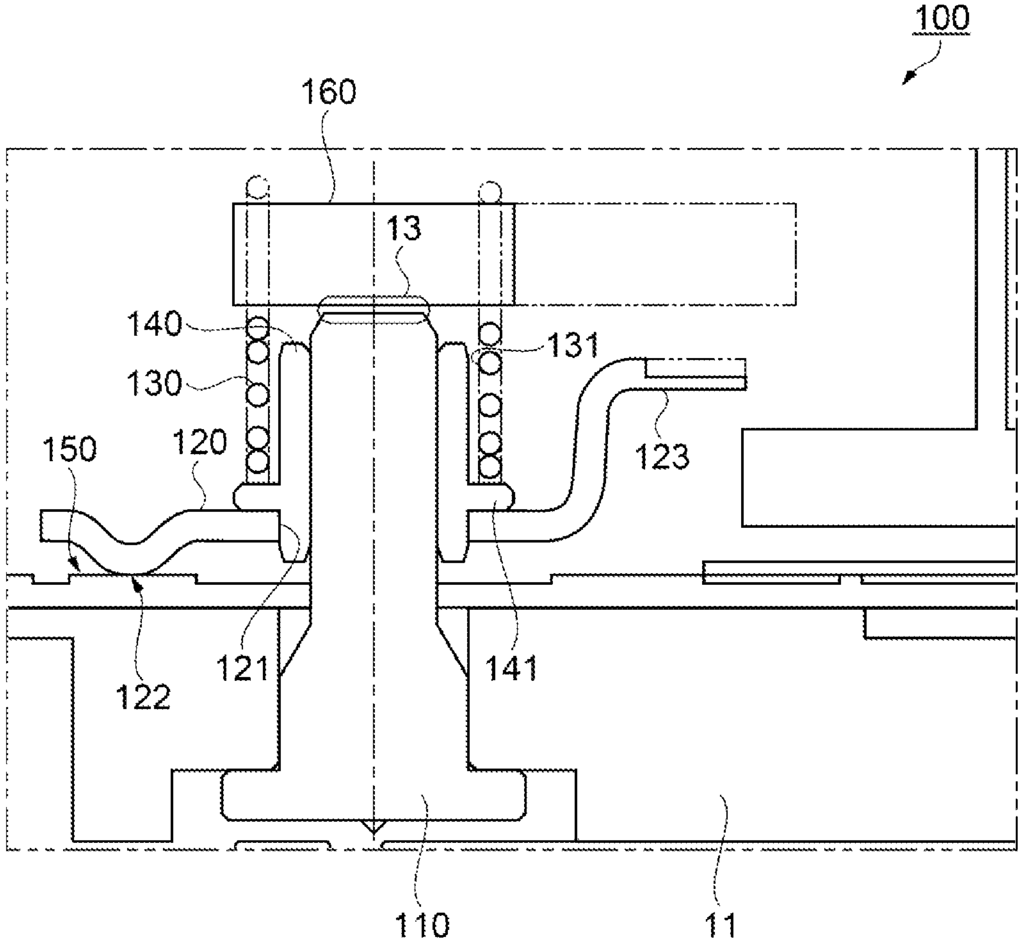
FIG. 5 is a cross-sectional view of the regulating switch illustrated in FIG. 3 taken along a line B-B.
Figures 8, 9:
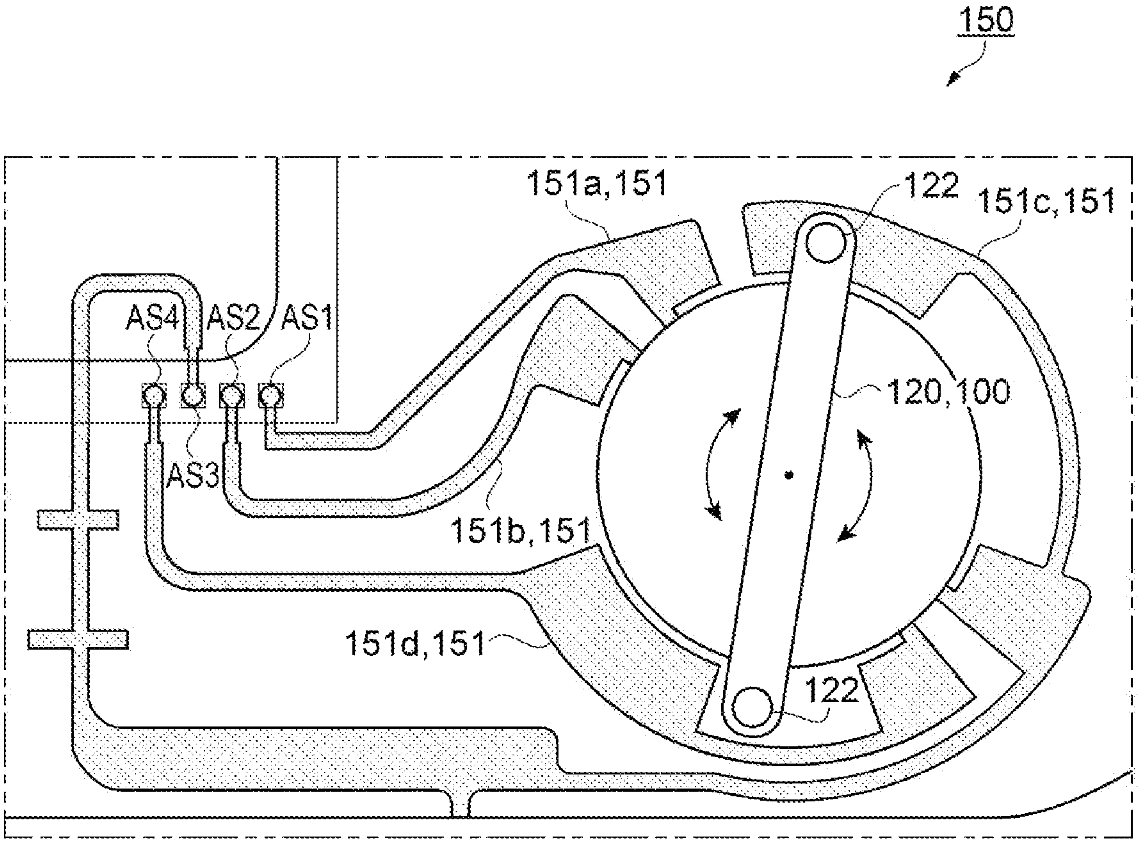
FIG. 8 is a plan view illustrating a configuration of a regulating pattern of a circuit board.
FIG. 9 is a table illustrating combinations for the regulating switch.

As illustrated in FIG. 5, the regulating switch 100 is disposed contactably with a circuit board 150 including a regulating pattern 151 (see FIG. 8). Specifically, the regulating switch 100 includes a guide pin 110, a lever body 120 and a coil spring 130.

The guide pin 110 is fixed to a main plate 11. The main plate 11 is a plate-like member at which a watch component such as a toothed gear (not illustrated) is disposed. The lever body 120 includes an opening portion 121 into which the guide pin 110 is inserted and a contact portion 122 that contacts the regulating pattern 151. In addition, the lever body 120 includes a setting knob 123 for rotationally moving a position of the contact portion 122 around a central axis of the guide pin 110. As illustrated in FIG. 4, the setting knobs 123 are disposed at two positions of the lever body 120.

The coil spring 130 includes an opening portion 131 into which the guide pin 110 is inserted and is used to press the lever body 120 toward the circuit board 150. A holding member 160 is disposed on a side opposite to the circuit board 150 with respect to the coil spring 130. The holding member 160 holds the coil spring 130 sandwiched between the holding member 160 and the lever body 120 so as to press the regulating switch 100 toward the circuit board 150.

Further, the regulating switch 100 includes a cylindrical lever shaft 140 into which the guide pin 110 is inserted and to which the lever body 120 is fixed. As described above, since the lever shaft 140 has the cylindrical shape, it is possible to increase a range of fitting between the lever shaft 140 and the guide pin 110, and it is possible to prevent the lever shaft 140 from being inclined with respect to the guide pin 110. Accordingly, since the lever body 120 is also prevented from being inclined, posture of the lever body 120 is stabilized, and the contact portion 122 of the lever body 120 can be reliably brought into contact with the regulating pattern 151.

Further, the lever shaft 140 is provided with a flange 141 which abuts on the lever body 120. Since the flange 141 is provided in this manner, when the lever body 120 is fitted to the lever shaft 140, a position of the lever body 120 can be determined, and posture of the lever body 120 with respect to the circuit board 150 can be made correct. Specifically, the coil spring 130 is sandwiched between the flange 141 and the holding member 160.

Note that as illustrated in FIG. 5, the guide pin 110 and the holding member 160 are normally disposed with a gap therebetween, but may abut on each other at a contact portion 13 when impact is applied to the watch 1. As described above, since the guide pin 110 and the holding member 160 are structured so as to abut on each other, it is possible to suppress extreme expansion and contraction of the coil spring 130 and to suppress deterioration of the coil spring 130.

Figure 3:
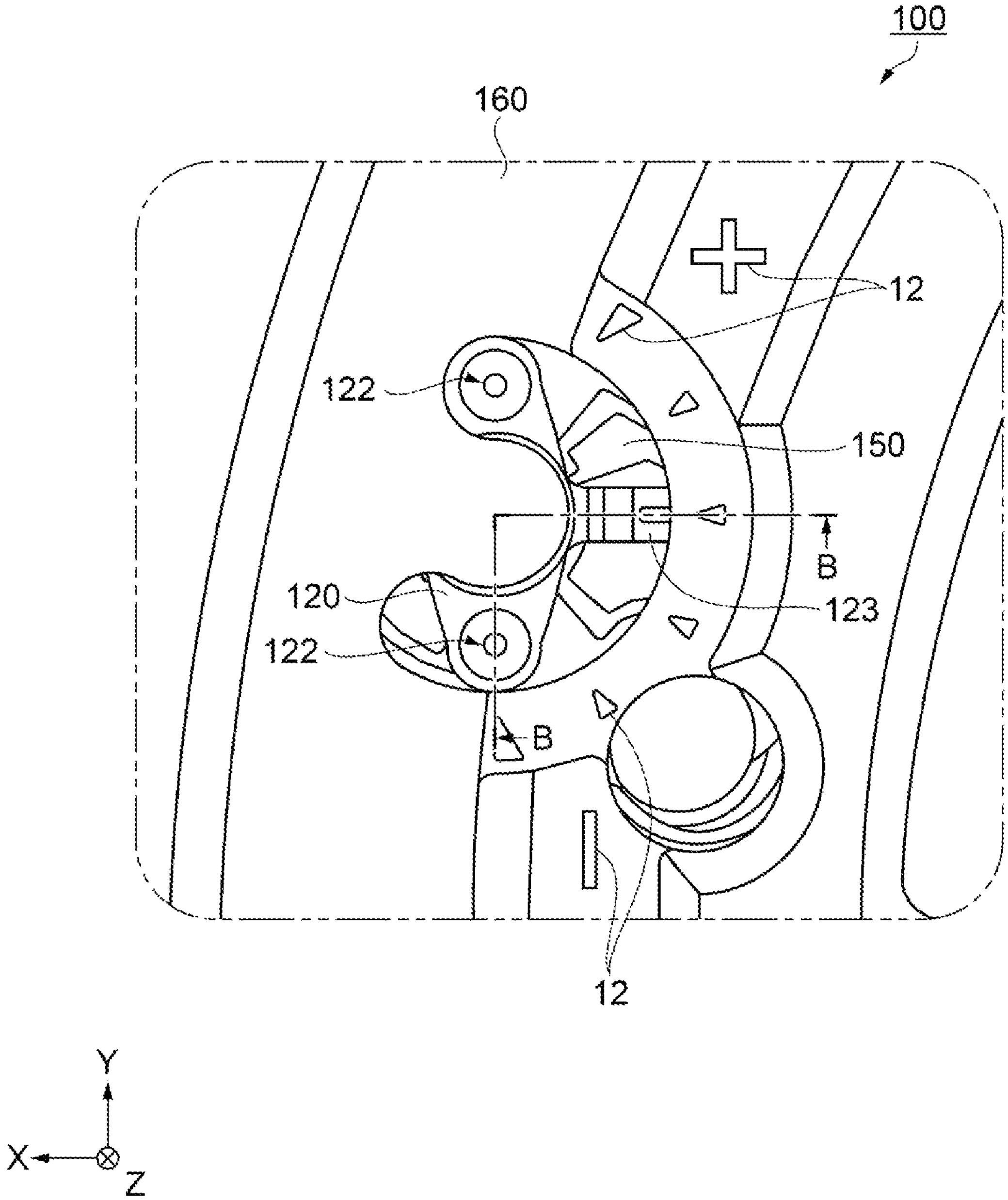
FIG. 3 is an enlarged plan view illustrating a part A of the watch illustrated in FIG. 2.
Figure 4:
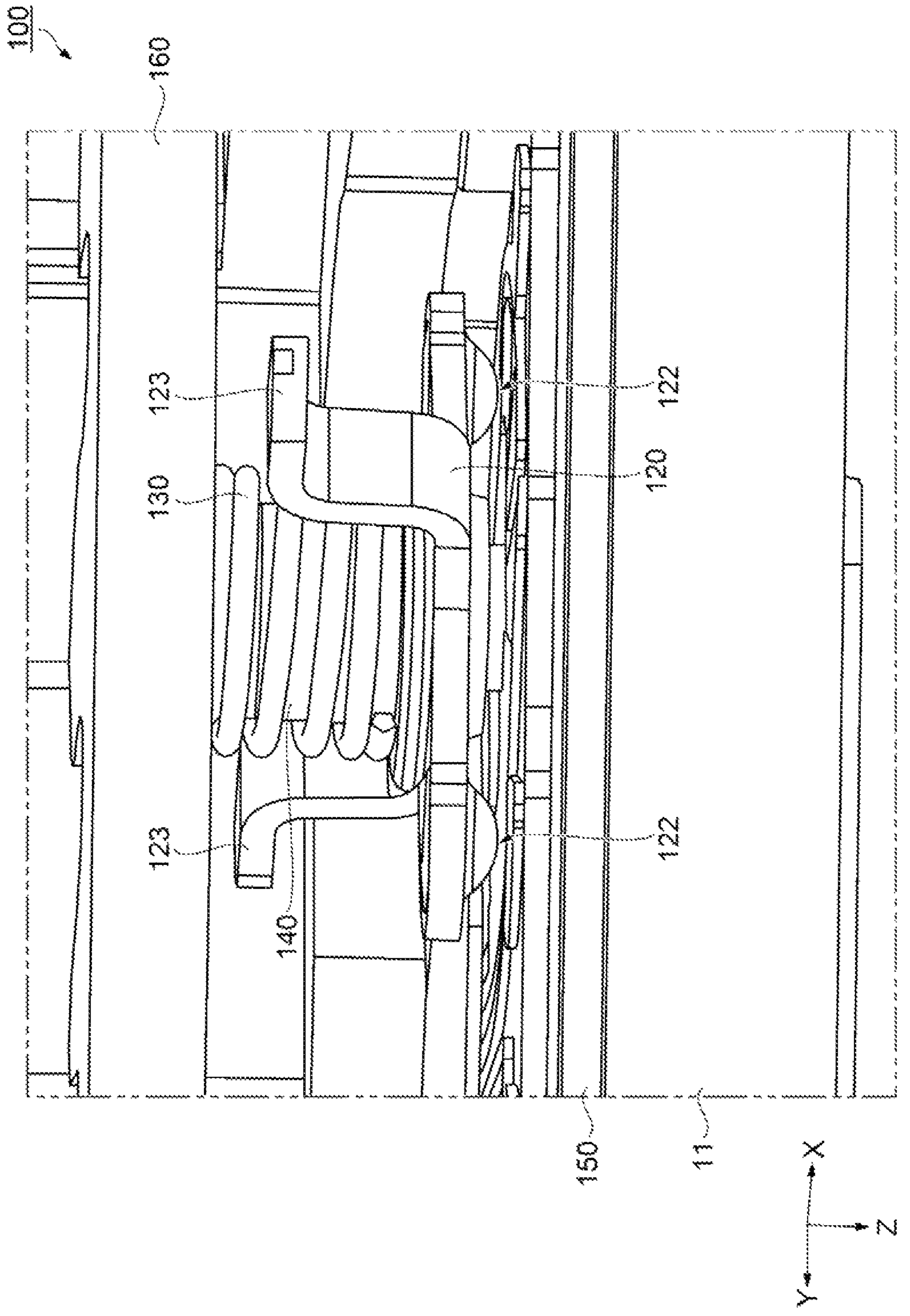
FIG. 4 is a perspective view illustrating a configuration of a regulating switch.

As illustrated in FIG. 3, indicators 12 of "+" and "−" are marked near the regulating switch 100. As described above, by rotating the setting knob 123 of the regulating switch 100 to move a position of the contact portion 122 in a "+" direction or a "−" direction, a delay and an advance can be adjusted.

As described above, since the lever body 120 and the coil spring 130 are separated from each other in the regulating switch 100, for example, deformation of the lever body 120 as when the lever body 120 has a function of a spring at the time of impact of the watch 1 is suppressed, and the regulating switch 100 can be reliably pressed toward the circuit board 150 by the coil spring 130. Furthermore, by using the coil spring 130, it is possible to suppress a decrease in spring force even when impact is applied to the watch 1, for example, as compared to a case where a plate spring is used. As a result, it is possible to make logical slowing/quickening function appropriately.

In addition, it is possible to easily perform accuracy adjustment by adjusting the regulating switch 100.

Next, a configuration of the lever body 120 will be described with reference to FIGS. 6A to 6C.

Figure 6A:
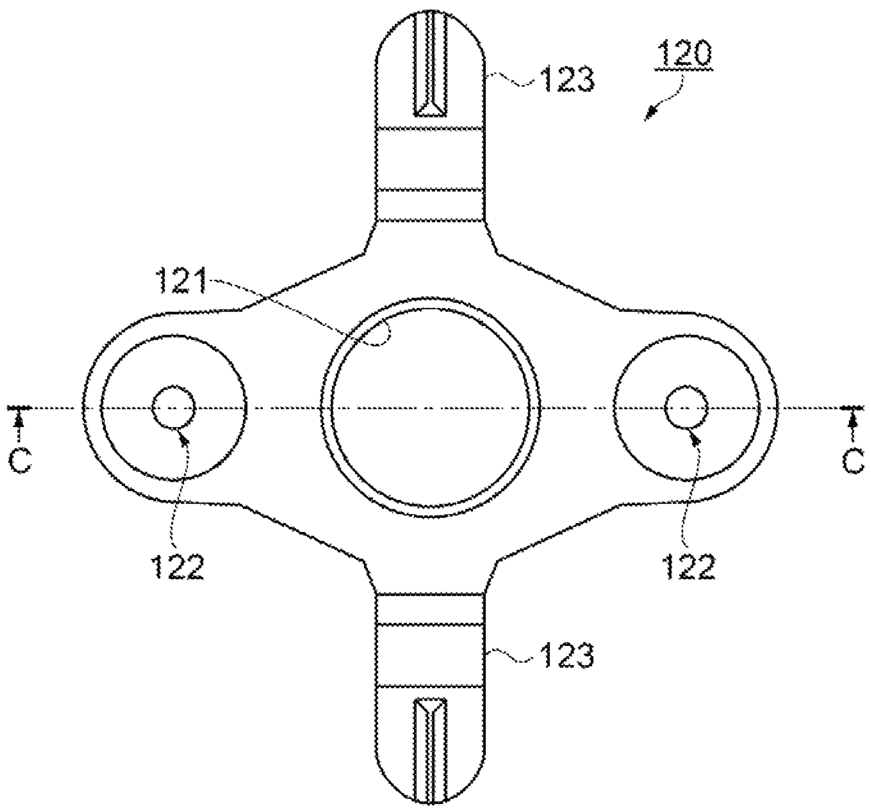
FIG. 6A is a plan view illustrating a configuration of a lever body of the regulating switch.

As illustrated in FIG. 6A, in the lever body 120, the two contact portions 122 are disposed facing each other, and the two setting knobs 123 are disposed facing each other, with the opening portion 121 into which the guide pin 110 is inserted as a center in plan view.

Figure 6B:
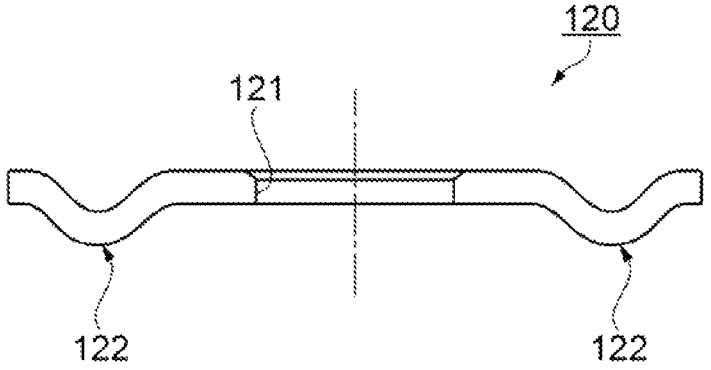
FIG. 6B is a cross-sectional view of the lever body illustrated in FIG. 6A taken along a line C-C.

As illustrated in FIG. 6B, the contact portion 122 electrically contacts the regulating pattern 151 of the circuit board 150 as described above. Note that the contact portion 122 has, for example, a substantially hemispherically curved shape so that the contact portion 122 smoothly contacts the regulating pattern 151 when the setting knob 123 is rotated.

Figure 6C:
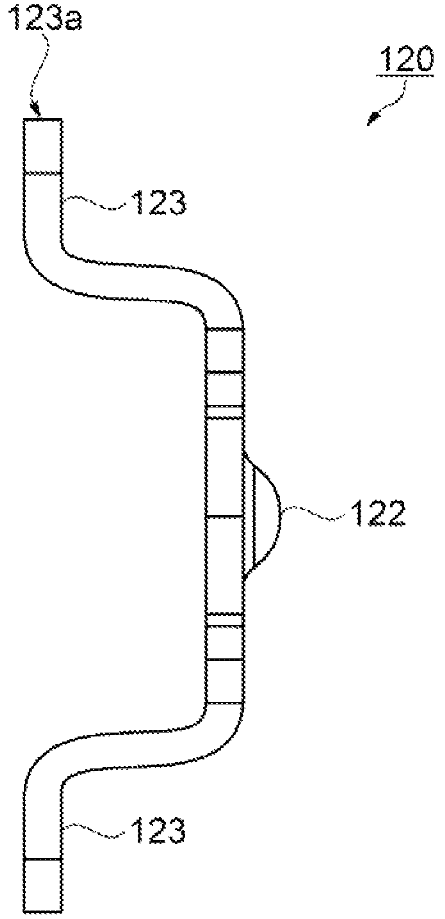
FIG. 6C is a side view illustrating the configuration of the lever body of the regulating switch.

As illustrated in FIG. 6C, the setting knob 123 is bent upward in an S shape from a surface at which the contact portion 122 is provided. That is, a tip 123*a* is in a state of floating from the above described surface so that the setting knob 123 can be easily grasped and rotated.

Next, a configuration of the lever shaft 140 will be described with reference to FIGS. 7A and 7B.

Figure 7A:
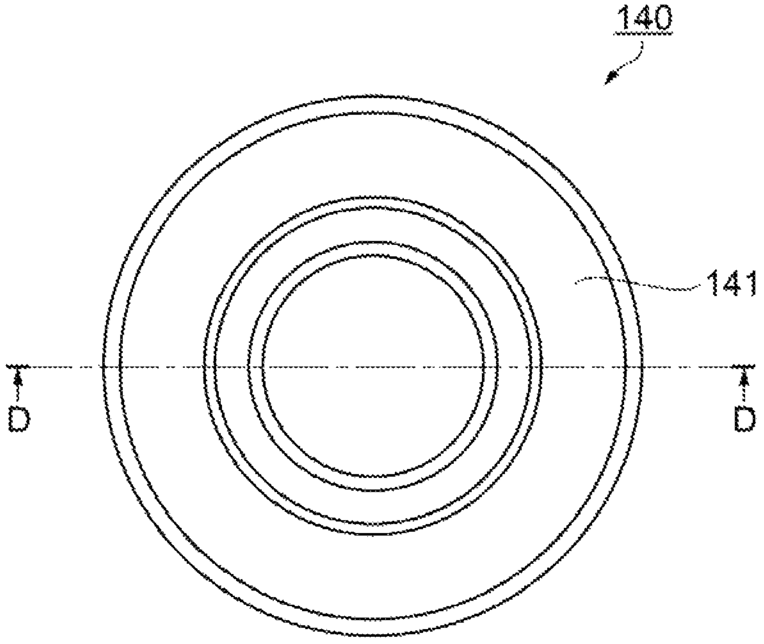
FIG. 7A is a plan view illustrating a configuration of a lever shaft of the regulating switch.
Figure 7B:
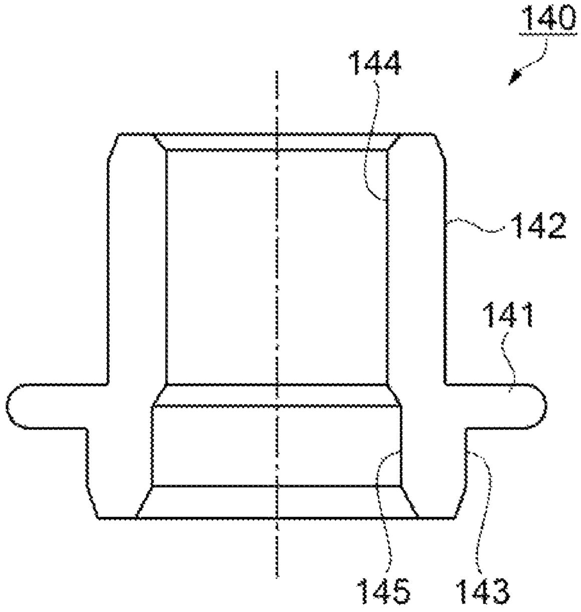
FIG. 7B is a cross-sectional view of the lever shaft illustrated in FIG. 7A taken along a line D-D.

As illustrated in FIGS. 7A and 7B, the lever shaft 140 is formed in the substantially cylindrical shape as described above. The lever shaft 140 includes a first cylindrical portion 142, a flange 141 and a second cylindrical portion 143. The opening portion 121 of the lever body 120 is press-fitted into the second cylindrical portion 143, whereby the lever body 120 is fixed to the lever shaft 140. Further, an upper surface of the lever body 120 abuts on a lower surface of the flange 141, and a height position of the lever body 120 in an axial direction of the lever shaft 140 is determined by the flange 141.

The guide pin 110 is inserted into an opening portion 144. Note that in the present embodiment, an opening portion 145 having a diameter larger than that of the opening portion 144 is included so that the guide pin 110 can be easily inserted. That is, the lever shaft 140 is formed in the opening portions 144 and 145 at two stages. Note that the configuration may be made only with the opening portion 144 without a step.

Next, with reference to FIGS. 8 and 9, a configuration of the circuit board 150 of a logical slowing/quickening scheme and a combination table of the logical slowing/quickening will be described.

As illustrated in FIG. 8, the circuit board 150 is a logical slowing/quickening type circuit that detects a short circuit of the regulating pattern 151 and performs quantitative correction. To be specific, the regulating pattern 151 includes a first regulating pattern 151*a*, a second regulating pattern 151*b*, a third regulating pattern 151*c* and a fourth regulating pattern 151*d*.

Further, the circuit board 150 is provided with a terminal AS1 coupled to the first regulating pattern 151*a*, a terminal AS2 coupled to the second regulating pattern 151*b*, a terminal AS3 coupled to the third regulating pattern 151*c* and a terminal AS4 coupled to the fourth regulating pattern 151*d*.

As illustrated in FIG. 9, according to the logical slowing/quickening combination table, accuracy adjustment in six stages of, for example, −2, −1, 0, +1, +2 and +3 as steps can be performed. For example, for the terminals AS1 to AS4, a case where a short circuit occurs results in "1". A case where there is no short circuit results in "0".

For example, in FIG. 8, the contact portion 122 of the lever body 120 of the regulating switch 100 contacts only the third regulating pattern 151*c* and does not contact the other regulating patterns 151. In this case, since the terminal AS3 corresponds to "1" and the other terminals AS1, AS2 and AS4 correspond to "0", the step results in "0" according to the logical slowing/quickening combination table illustrated in FIG. 9, and a time is not adjusted.

For example, in FIG. 8, it is assumed that the contact portion 122 of the lever body 120 contacts both the third regulating pattern 151*c* and the fourth regulating pattern 151*d*. In this case, since the terminal AS3 corresponds to "1" and the terminal AS4 corresponds to "1", the step results in "+1" according to the logical slowing/quickening combination table illustrated in FIG. 9, so that a time can be advanced.

Figure 10:
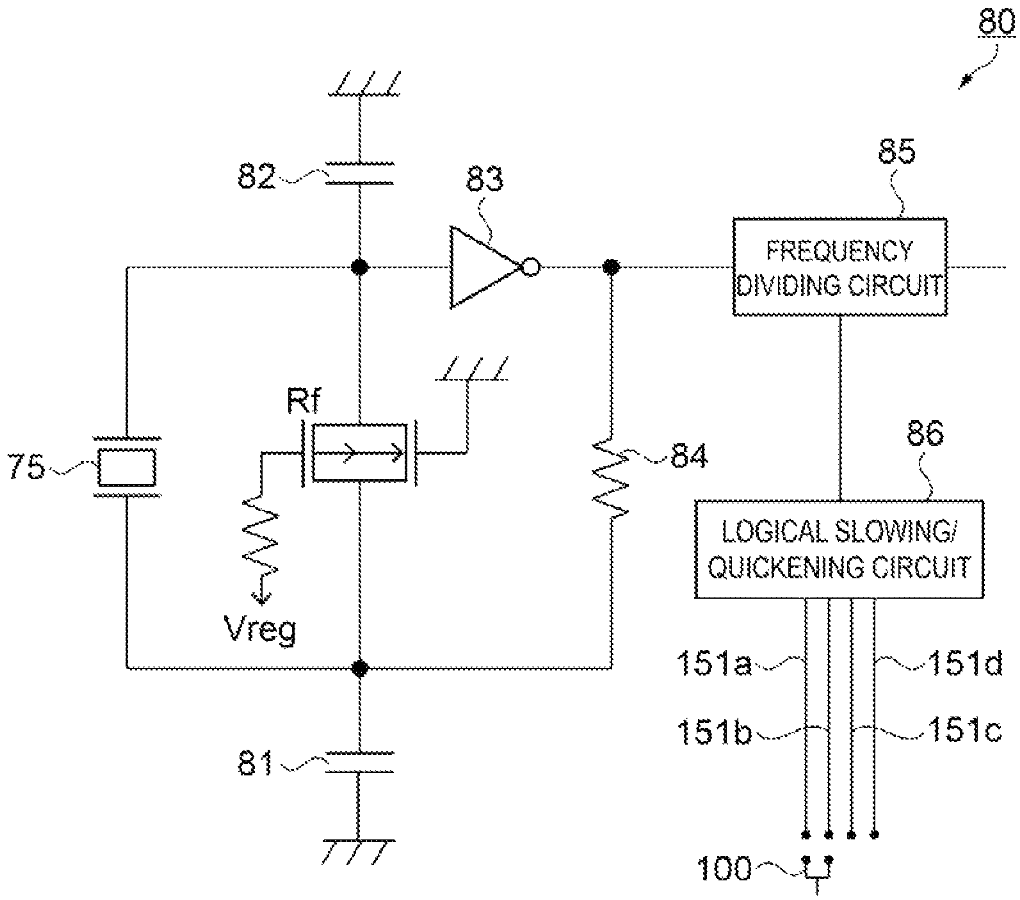
FIG. 10 is a block diagram illustrating a configuration of an oscillation circuit including a logical slowing/quickening circuit.

Next, with reference to FIG. 10, a configuration of an oscillation circuit 80 including a logical slowing/quickening circuit 86 formed at the circuit board 150 will be described.

The oscillation circuit 80 includes, for example, an amplifier 83 such as an inverter, a feedback resistor 84, a gate capacitor 81 and a drain capacitor 82. Electric power supplied from a battery which is a power supply (not illustrated) generates a voltage Vreg by a power supply circuit, and the voltage is supplied to the oscillation circuit 80.

The oscillation circuit 80 outputs an oscillation signal of 32 KHz serving as a source oscillation using a crystal oscillator 75 as a time reference source. The oscillation signal is frequency-divided to a predetermined frequency by a frequency dividing circuit 85 including a plurality of frequency dividers (for example, 15-stage flip-flops).

In time accuracy adjustment, characteristics of an individual crystal oscillator 75 are inspected in advance, and an amount of regulation corresponding to each oscillation circuit 80 is set by the logical slowing/quickening circuit 86. To be specific, by appropriately selecting and short-circuiting the regulating patterns 151*a* to 151*d*, the amount of regulation according to the oscillation circuit 80 is set. Note that in the present embodiment, for example, a configuration is adopted in which the amount of regulation is adjusted to t seconds (sec/day) for each step.

Further, although the characteristics of the crystal oscillator 75 may change over time, for example, an appropriate amount of regulation can be set, by inspecting the characteristics of the crystal oscillator 75 again after a lapse of several years from manufacture of the watch 1, and rotating the rotary switch in accordance with the changed characteristics to select appropriate regulating patterns 151*a* to 151*d*. Thus, time accuracy can be appropriately maintained for a long period of time.

As described above, the watch 1 of the present embodiment includes the main plate 11 at which a watch component is disposed, the circuit board 150 including the regulating pattern 151, the regulating switch 100 disposed contactably with the circuit board 150, and the holding member 160 disposed on the side opposite to the circuit board 150 with respect to the regulating switch 100, wherein the regulating switch 100 includes the guide pin 110 fixed to the main plate 11, the lever body 120 including the opening portion 121 into which the guide pin 110 is inserted and the contact portion 122 that contacts the regulating pattern 151, and the coil spring 130 including the opening portion 131 into which the guide pin 110 is inserted and pressing the lever body 120 toward the circuit board 150, and the holding member 160 holds the coil spring 130 sandwiched between the holding member 160 and the lever body 120.

According to this configuration, since the lever body 120 and the coil spring 130 are separated from each other in the regulating switch 100, for example, deformation of the lever body 120 as when the lever body 120 has a function of a spring at the time of impact of the watch 1 is suppressed, and the regulating switch 100 can be reliably pressed toward the circuit board 150 by the coil spring 130. Furthermore, by using the coil spring 130, it is possible to suppress a decrease in spring force even when impact is applied to the watch 1, for example, as compared to a case where a plate spring is used. As a result, it is possible to make logical slowing/quickening function appropriately.

In addition, vibration of the crystal oscillator 75 is minute but is also transmitted to the circuit board 150 in a resonant manner. When the force applied to the circuit board 150 changes, the vibration of the crystal oscillator 75 is also affected, which causes accuracy of the watch 1 to be deteriorated, as a result. However, since the spring force can be stably maintained for a long time as in the present embodiment, the accuracy of the watch 1 can be stabilized for a long time.

Further, in the watch 1 of the present embodiment, the guide pin 110 and the holding member 160 may abut on each other at the time of impact. According to the configuration, when impact is applied to the watch 1, since the guide pin 110 and the holding member 160 are structured so as to abut on each other, it is possible to suppress extreme expansion and contraction of the coil spring 130 and to suppress deterioration of the coil spring 130.

In addition, in the watch 1 of the present embodiment, the regulating switch 100 may include the cylindrical lever shaft 140 into which the guide pin 110 is inserted and to which the lever body 120 is fixed. According to this configuration, since the cylindrical lever shaft 140 is provided, it is possible to increase the range of fitting between the lever shaft 140 and the guide pin 110, prevent the lever shaft 140 from being inclined, and accordingly, prevent the lever body 120 from being inclined. Therefore, posture of the lever body 120 is stabilized, and it is possible to reliably bring the contact portion 122 of the lever body 120 into contact with the regulating pattern 151.

In addition, in the watch 1 of the present embodiment, the lever shaft 140 may include the flange 141 that abuts on the lever body 120. According to this configuration, since the flange 141 is provided, when the lever body 120 is fitted to the lever shaft 140, a position of the lever body 120 can be determined, and posture of the lever body 120 with respect to the circuit board 150 can be made correct.

Modifications of the embodiment described above will be described below.

As described above, the regulating switch 100 includes the lever body 120 and the lever shaft 140, but is not limited thereto, and may be configured without the lever shaft 140. In this case, the opening portion 121 of the lever body 120 and the guide pin 110 are brought into contact with each other. Accordingly, also in the configuration in which the lever shaft 140 is not provided, since the coil spring 130 is provided, it is possible to suppress a decrease in spring force even when impact is applied to the watch 1, as compared to a case in which a leaf spring is used.

As described above, in the lever body 120, the two contact portions 122 are disposed facing each other, and the two setting knobs 123 are disposed facing each other, with the opening portion 121 into which the guide pin 110 is inserted as the center in plan view, but the present disclosure is not limited thereto. For example, it is sufficient that one or more contact portions 122 or setting knobs 123 are provided, and the two contact portions 122 or the two setting knobs 123 need not be disposed facing each other.

What is claimed is:

1. A watch, comprising:

a main plate at which a watch component is disposed;

a circuit board having a first surface and a second surface outwardly opposite to each other, the first surface of the circuit board including a regulating pattern;

a rotary switch disposed contactably with the circuit board; and a holding member disposed on a side opposite to the circuit board with respect to the rotary switch, wherein the rotary switch includes:

a guide pin fixed to the main plate, the guide pin being elongated along a first direction;

a lever body including a first opening portion into which the guide pin is inserted, a first lever part having a contact portion that contacts the regulating pattern, and a second lever part having a knob, the first and second lever parts of the lever body being elongated from the first opening portion toward an outside in different directions, respectively; and a coil spring disposed between the holding member and the first and second lever parts of the lever body along the first direction, the coil spring including a second opening portion into which the guide pin is inserted, the coil spring pressing the lever body toward the circuit board, a distal end of the second lever part of the lever body is located closer to the holding member than a proximal end of the second lever part of the lever body along the first direction, and a proximal end of the first lever part of the lever body is located closer to the holding member than the contact portion of the first lever part of the lever body.

2. The watch according to claim 1, wherein the guide pin and the holding member abut against each other when impact is applied.

3. The watch according to claim 1, wherein the rotary switch includes a cylindrical lever shaft into which the guide pin is inserted and to which the lever body is fixed.

4. The watch according to claim 3, wherein the cylindrical lever shaft includes a flange that contacts the lever body.

* * * * *